US008674975B2

(12) United States Patent
Chuang et al.

(10) Patent No.: US 8,674,975 B2
(45) Date of Patent: Mar. 18, 2014

(54) LIQUID CRYSTAL DISPLAY AND DRIVING METHOD WITH COMMON VOLTAGE CONTROL FOR AVOIDING FLICKER AND COLOR-SHIFT PHENOMENA

(75) Inventors: Young-Ran Chuang, Hsin-Chu (TW); Ching-Huan Lin, Hsin-Chu (TW); Norio Sugiura, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 229 days.

(21) Appl. No.: 13/154,463

(22) Filed: Jun. 7, 2011

(65) Prior Publication Data

US 2012/0169694 A1 Jul. 5, 2012

(30) Foreign Application Priority Data

Dec. 30, 2010 (TW) ................................ 99147039 A

(51) Int. Cl.
*G09G 5/00* (2006.01)
*G02F 1/1343* (2006.01)

(52) U.S. Cl.
USPC ................. 345/211; 345/92; 349/38; 349/39; 349/139

(58) Field of Classification Search
USPC ......... 345/90–104, 211–213; 349/38–45, 139
See application file for complete search history.

(56) References Cited

U.S. PATENT DOCUMENTS

| | | | |
|---|---|---|---|
| 2002/0081847 | A1 | 6/2002 | Jo |
| 2002/0135710 | A1 | 9/2002 | Chae |
| 2007/0070024 | A1 | 3/2007 | Araki |
| 2009/0027320 | A1 | 1/2009 | Lai |
| 2009/0225018 | A1 | 9/2009 | Kim |
| 2010/0225569 | A1 | 9/2010 | Park |

FOREIGN PATENT DOCUMENTS

| | | |
|---|---|---|
| TW | 200717091 | 5/2007 |
| TW | 200832326 | 8/2008 |

*Primary Examiner* — Srilakshmi K Kumar
*Assistant Examiner* — James Nokham
(74) *Attorney, Agent, or Firm* — Winston Hsu; Scott Margo

(57) ABSTRACT

A liquid crystal display includes a first switch for outputting a first electrode voltage according to a first data signal and a first gate signal, a second switch for outputting a second electrode voltage according to a second data signal and the first gate signal, a liquid crystal capacitor for controlling liquid-crystal transmittance according to the difference between the first and second electrode voltages, a first storage capacitor for storing the first electrode voltage, a third switch, a second storage capacitor for storing the second electrode voltage, and a fourth switch. The third switch controls the operation of furnishing a first common voltage to the first storage capacitor according to a second gate signal, for adjusting the first electrode voltage. The fourth switch controls the operation of furnishing a second common voltage to the second storage capacitor according to the second gate signal, for adjusting the second electrode voltage.

17 Claims, 7 Drawing Sheets

LIQUID CRYSTAL DISPLAY AND DRIVING METHOD WITH COMMON VOLTAGE CONTROL FOR AVOIDING FLICKER AND COLOR-SHIFT PHENOMENA

BACKGROUND

1. Technical Field

The description relates to a liquid crystal display and driving method thereof, and more particularly, to a liquid crystal display capable of stabilizing high voltage drop provided across opposite sides of a liquid crystal layer and driving method thereof.

2. Description of the Related Art

Liquid crystal displays (LCDs) have advantages of a thin profile, low power consumption, and low radiation, and are broadly adopted for application in media players, mobile phones, personal digital assistants (PDAs), computer displays, and flat screen televisions. The operation of a liquid crystal display is featured by modulating the voltage drop across opposite sides of a liquid crystal layer for twisting the angles of liquid crystal molecules in the liquid crystal layer so that the transmittance of the liquid crystal layer can be controlled for illustrating images with the aid of light source provided by a backlight module. With the aim of enhancing display quality of liquid crystal displays, utilization of blue phase (BP) liquid crystal to achieve super-high frame rate and super-wide viewing angle has gained more and more attractiveness. However, in the operation of BP-mode liquid crystal displays, the voltage drop required for twisting the angles of BP liquid crystal molecules is significantly greater than the voltage drop required for twisting the angles of conventional liquid crystal molecules. For that reason, the driving circuit of conventional liquid crystal displays cannot meet the driving requirement of BP-mode liquid crystal displays.

FIG. 1 is a circuit embodiment diagram schematically showing a BP-mode liquid crystal display using prior-art driving circuit. As shown in FIG. 1, the BP-mode liquid crystal display 100 includes a plurality of data lines 102, a plurality of gate lines 104, and a plurality of pixel units 110. In the operation of pixel unit PUn_m, the first data switch SW1 is utilized for outputting a first electrode voltage Vp1 according to a gate signal SGn and a data signal SDm, the first storage capacitor Cst1 is employed to store the first electrode voltage Vp1, the second data switch SW2 is utilized for outputting a second electrode voltage Vp2 according to the gate signal SGn and a data signal SDm+1, and the second storage capacitor Cst2 is employed to store the second electrode voltage Vp2. Further, the first common voltage Vcom1 can be employed to adjust the first electrode voltage Vp1 through coupling of the first storage capacitor Cst1, and the second common voltage Vcom2 can be employed to adjust the second electrode voltage Vp2 through coupling of the second storage capacitor Cst2, for enlarging voltage difference between the first electrode voltage Vp1 and the second electrode voltage Vp2, such that the voltage drop across opposite sides of the liquid crystal capacitor Clc can be employed to control the transmittance of a BP liquid crystal layer.

FIG. 2 is a schematic diagram showing related signal waveforms regarding the operation of the BP-mode liquid crystal display 100 illustrated in FIG. 1, having time along the abscissa. The signal waveforms in FIG. 2, from top to bottom, are the gate signal SGn, the first common voltage Vcom1, the first electrode voltage Vp1, the second common voltage Vcom2, and the second electrode voltage Vp2. Referring to FIG. 2 in conjunction with FIG. 1, during an interval T1, the first electrode voltage Vp1 is set to a first high voltage VH1 by the first data switch SW1 according to the data signal SDm and the gate pulse of the gate signal SGn, and the second electrode voltage Vp2 is set to a first low voltage VL1 by the second data switch SW2 according to the data signal SDm+1 and the gate pulse of the gate signal SGn. During an interval T2, the first electrode voltage Vp1 is pulled down to a second high voltage VH2 by the falling edge of the gate pulse through coupling of the device capacitor of the first data switch SW1, and the second electrode voltage Vp2 is pulled down to a second low voltage VL2 by the falling edge of the gate pulse through coupling of the device capacitor of the second data switch SW2. During an interval T3, the first electrode voltage Vp1 is pulled up to a third high voltage VH3 by the rising edge of the first common voltage Vcom1 through coupling of the first storage capacitor Cst1, and the second electrode voltage Vp2 is pulled down to a third low voltage VL3 by the falling edge of the second common voltage Vcom2 through coupling of the second storage capacitor Cst2, for enlarging voltage difference between the first electrode voltage Vp1 and the second electrode voltage Vp2. However, after the interval T3, the rising/falling edge of the first common voltage Vcom1 still has an effect on the first electrode voltage Vp1, and the rising/falling edge of the second common voltage Vcom2 still has an effect on the second electrode voltage Vp2, which is likely to cause the phenomena of flickering and color-shift on LCD screen.

SUMMARY

In accordance with an embodiment, a liquid crystal display capable of stabilizing high voltage drop provided across opposite sides of a liquid crystal layer is disclosed. The liquid crystal display comprises a first gate line for transmitting a first gate signal, a second gate line for transmitting a second gate signal, a first data line for transmitting a first data signal, a second data line for transmitting a second data signal, a first data switch, a second data switch, a liquid crystal capacitor, a first storage capacitor, a first auxiliary switch, a second storage capacitor, and a second auxiliary switch.

The first data switch comprises a first end electrically connected to the first data line for receiving the first data signal, a gate end electrically connected to the first gate line for receiving the first gate signal, and a second end for outputting a first electrode voltage. The second data switch comprises a first end electrically connected to the second data line for receiving the second data signal, a gate end electrically connected to the first gate line for receiving the first gate signal, and a second end for outputting a second electrode voltage. The liquid crystal capacitor, electrically connected between the second end of the first data switch and the second end of the second data switch, is utilized for controlling liquid-crystal transmittance according to a difference between the first electrode voltage and the second electrode voltage. The first storage capacitor comprises a first end electrically connected to the second end of the first data switch and a second end electrically connected to the first auxiliary switch. The first auxiliary switch comprises a first end for receiving a first common voltage, a gate end electrically connected to the second gate line for receiving the second gate signal, and a second end electrically connected to the second end of the first storage capacitor. The first auxiliary switch is employed to provide a control of furnishing the first common voltage to the second end of the first storage capacitor according to the second gate signal. The second storage capacitor comprises a first end electrically connected to the second end of the second data switch and a second end electrically connected to the second auxiliary switch. The second auxiliary switch comprises a first end for receiving a second common voltage, a gate end electrically connected to the second gate line for receiving the second gate signal, and a second end electrically connected to the second end of the second storage capacitor. The second auxiliary switch is employed to provide a control of furnishing the second common voltage to the second end of the second storage capacitor according to the second gate signal.

The present invention further discloses a driving method for use in a liquid crystal display capable of stabilizing high voltage drop provided across opposite sides of a liquid crystal layer. The liquid crystal display includes a first gate line for transmitting a first gate signal having a first gate pulse, a second gate line for transmitting a second gate signal having a second gate pulse, a first data line for transmitting a first data signal, a second data line for transmitting a second data signal, a first data switch for outputting a first electrode voltage according to the first gate pulse and the first data signal, a second data switch for outputting a second electrode voltage according to the first gate pulse and the second data signal, a liquid crystal capacitor for controlling liquid-crystal transmittance according to a difference between the first electrode voltage and the second electrode voltage, a first storage capacitor for storing the first electrode voltage, a first auxiliary switch for providing a control of adjusting the first electrode voltage by furnishing the first common voltage to the first storage capacitor according to the second gate pulse, a second storage capacitor for storing the second electrode voltage, and a second auxiliary switch for providing a control of adjusting the second electrode voltage by furnishing the second common voltage to the second storage capacitor according to the second gate pulse.

The driving method comprises: providing the first gate pulse to the first gate line, providing the first data signal to the first data line, and providing the second data signal to the second data line during a first interval; the first data switch outputting the first electrode voltage according to the first gate pulse and the first data signal, and the second data switch outputting the second electrode voltage according to the first gate pulse and the second data signal during the first interval; providing the second gate pulse partly overlapped with the first gate pulse to the second gate line during a second interval partly overlapped with the first interval; the first auxiliary switch furnishing the first common voltage to the first storage capacitor according to the second gate pulse, and the second auxiliary switch furnishing the second common voltage to the second storage capacitor according to the second gate pulse during the second interval; providing the first gate signal having low-level voltage for turning off the first and second data switches during a third interval within the second interval and not overlapped with the first interval; and providing the second gate signal having low-level voltage for turning off the first and second auxiliary switches after the third interval.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
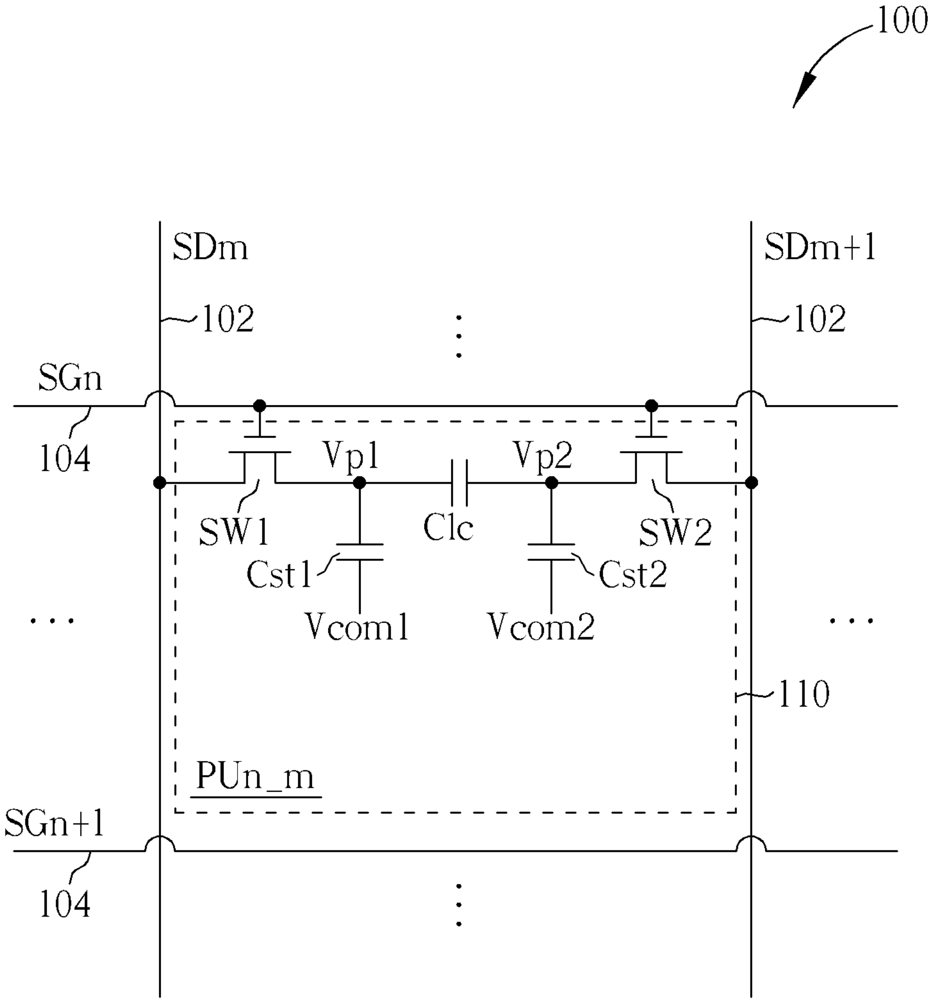
FIG. 1 PRIOR ART
FIG. 1 is a circuit embodiment diagram schematically showing a BP-mode liquid crystal display using prior-art driving circuit.
Figure 2:
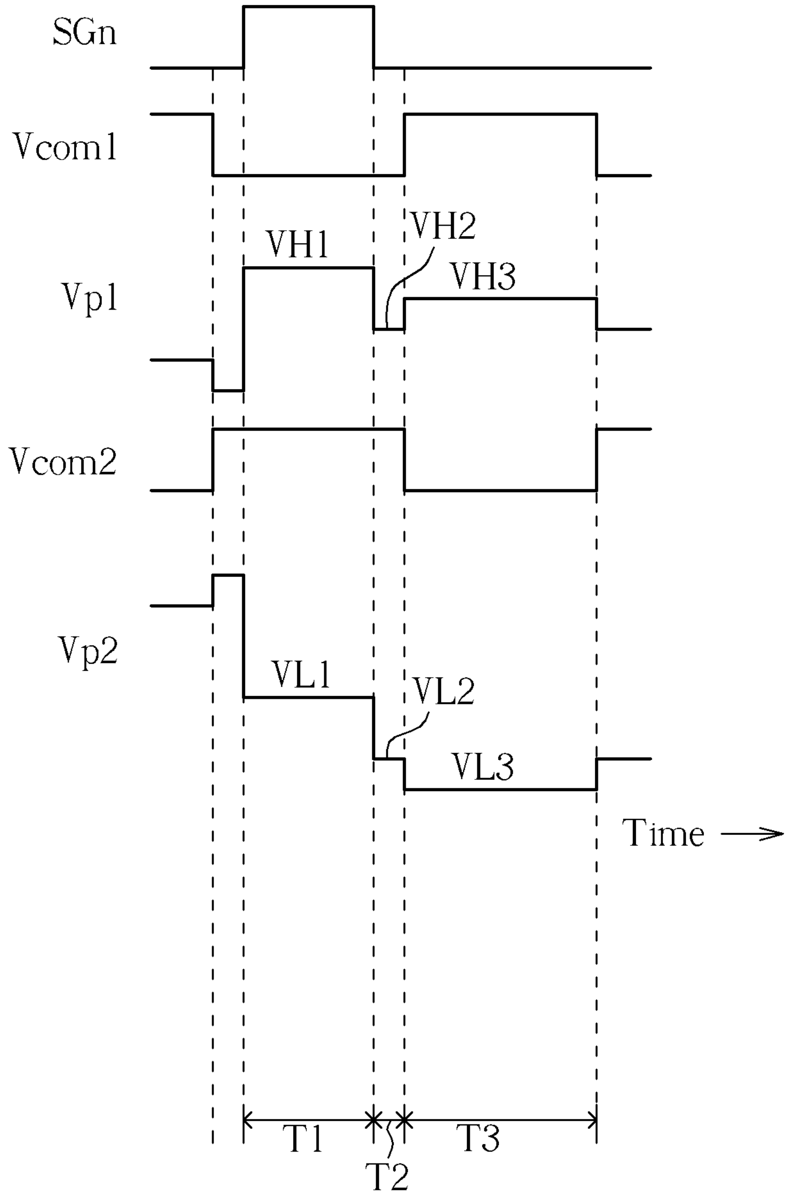
FIG. 2 PRIOR ART
FIG. 2 is a schematic diagram showing related signal waveforms regarding the operation of the BP-mode liquid crystal display illustrated in FIG. 1, having time along the abscissa.
Figure 3:
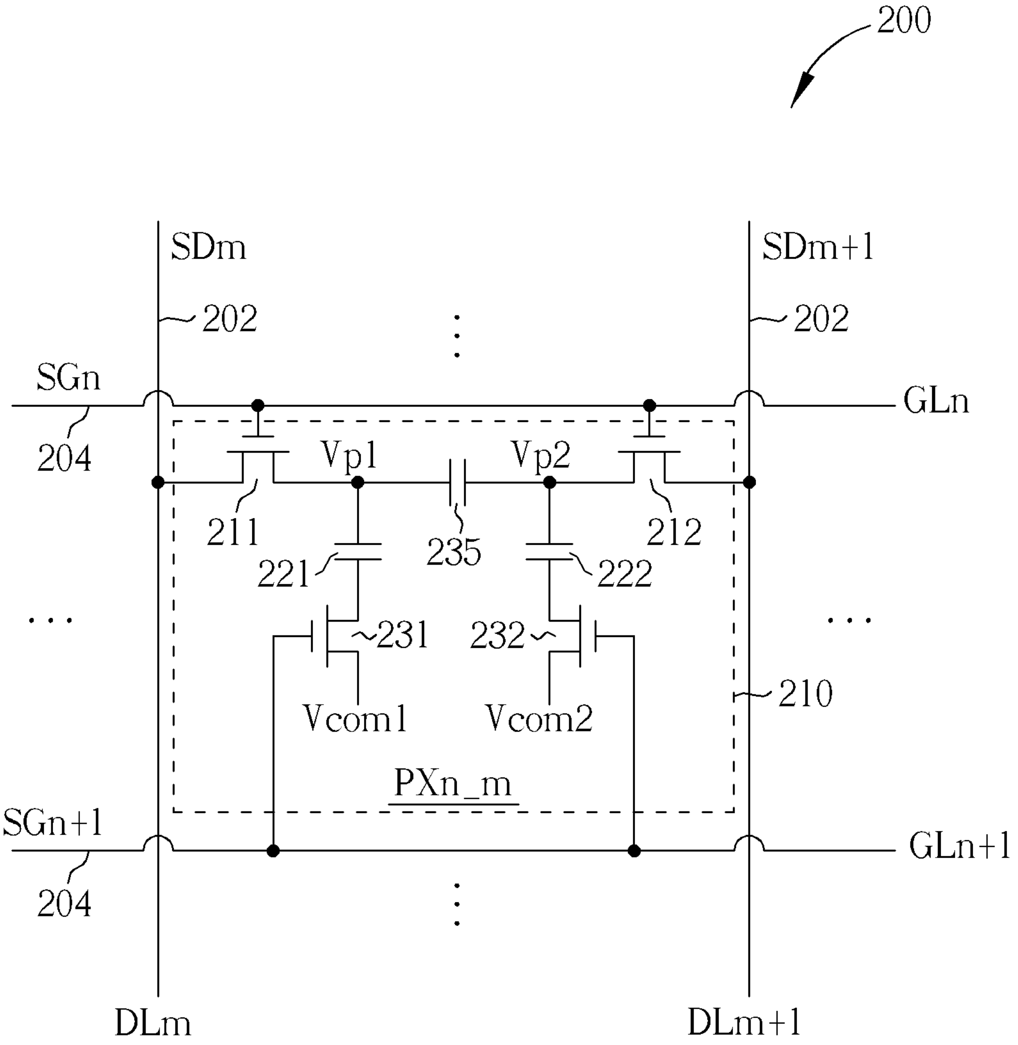
FIG. 3 is a schematic diagram showing a liquid crystal display in accordance with a first embodiment.

FIG. 3 is a schematic diagram showing a liquid crystal display in accordance with a first embodiment. As shown in FIG. 3, the liquid crystal display 200 comprises a plurality of data lines 202 for transmitting data signals, a plurality of gate lines 204 for transmitting gate signals, and a plurality of pixel units 210. In the following, pixel unit PXn_m is utilized for illustrating interconnections and circuit functions of each component of the pixel units 210. The pixel unit PXn_m includes a first data switch 211, a second data switch 212, a first storage capacitor 221, a second storage capacitor 222, a first auxiliary switch 231, a second auxiliary switch 232, and a liquid crystal capacitor 235. The first data switch 211, the second data switch 212, the first auxiliary switch 231 and the second auxiliary switch 232 may each be a thin film transistor (TFT), a field effect transistor (FET) or other similar device having connection/disconnection switching functionality.

The first data switch 211 comprises a first end electrically connected to a data line DLm for receiving a data signal SDm, a gate end electrically connected to a gate line GLn for receiving a gate signal SGn, and a second end for outputting a first electrode voltage Vp1. The second data switch 212 comprises a first end electrically connected to a data line DLm+1 for receiving a data signal SDm+1, a gate end electrically connected to the gate line GLn for receiving the gate signal SGn, and a second end for outputting a second electrode voltage Vp2. The liquid crystal capacitor 235, electrically connected between the second ends of the first data switch 211 and the second data switch 212, is utilized for controlling liquid-crystal transmittance according to the difference between the first electrode voltage Vp1 and the second electrode voltage Vp2. The first storage capacitor 221 is utilized for storing the first electrode voltage Vp1, and comprises a first end electrically connected to the second end of the first data switch 211 and a second end electrically connected to the first auxiliary switch 231. The first auxiliary switch 231 comprises a first end for receiving a first common voltage Vcom1, a gate end electrically connected to a gate line GLn+1 for receiving agate signal SGn+1, and a second end electrically connected to the second end of the first storage capacitor 221. The first auxiliary switch 231 is employed to provide a control of furnishing the first common voltage Vcom1 to the second end of the first storage capacitor 221 according to the gate signal SGn+1. In other words, the first auxiliary switch 231 is utilized for enabling/disabling an adjustment operation on the first electrode voltage Vp1 with the aid of the first common voltage Vcom1 according to the gate signal SGn+1.

The second storage capacitor 222 is utilized for storing the second electrode voltage Vp2, and comprises a first end electrically connected to the second end of the second data switch 212 and a second end electrically connected to the second auxiliary switch 232. The second auxiliary switch 232 comprises a first end for receiving a second common voltage Vcom2, a gate end electrically connected to the gate line GLn+1 for receiving the gate signal SGn+1, and a second end electrically connected to the second end of the second storage capacitor 222. In one embodiment, the first common voltage Vcom1 and the second common voltage Vcom2 are ac voltages, and the second common voltage Vcom2 may have a phase opposite to the first common voltage Vcom1. The second auxiliary switch 232 is employed to provide a control of furnishing the second common voltage Vcom2 to the second end of the second storage capacitor 222 according to the gate signal SGn+1. In other words, the second auxiliary switch 232 is utilized for enabling/disabling an adjustment operation on the second electrode voltage Vp2 with the aid of the second common voltage Vcom2 according to the gate signal SGn+1.

Figure 4:
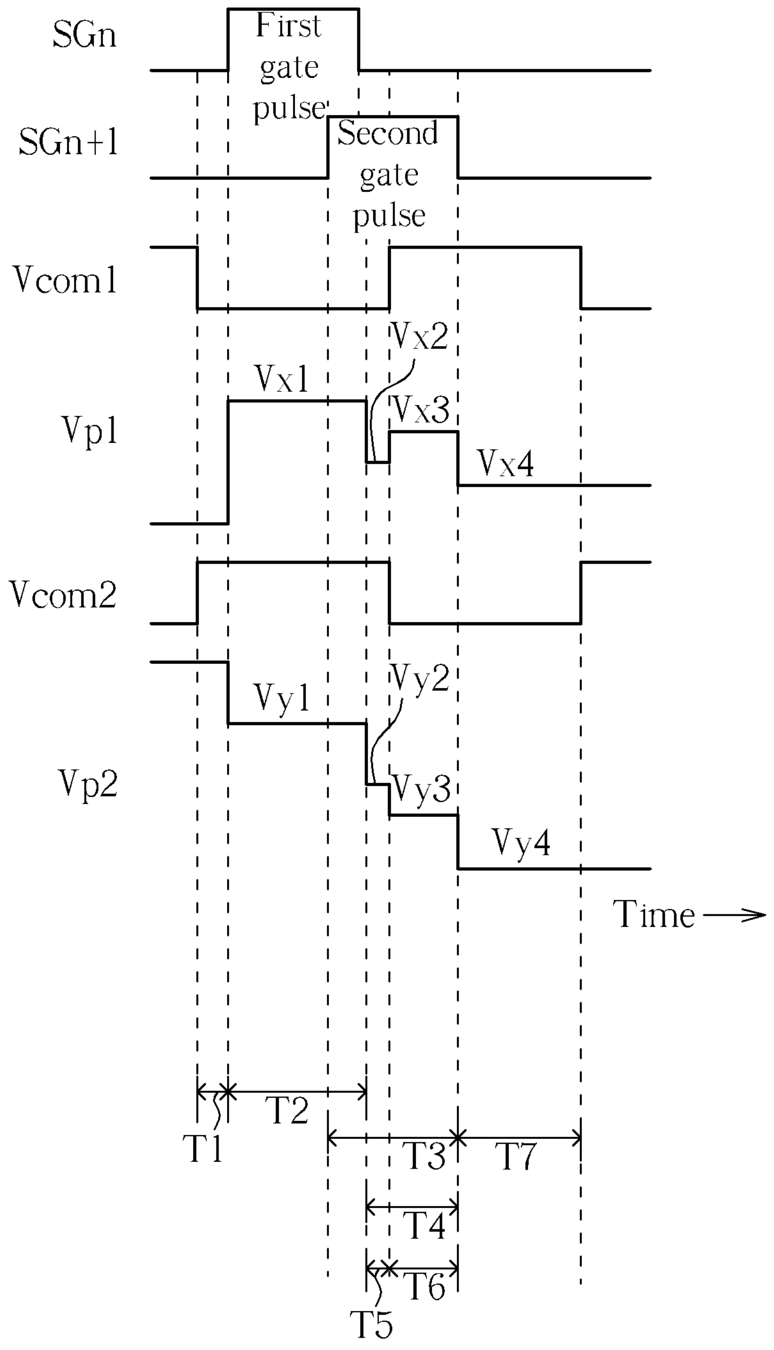
FIG. 4 is a schematic diagram showing related signal waveforms regarding the operation of the liquid crystal display illustrated in FIG. 3 based on a first driving method of the present invention, having time along the abscissa.

FIG. 4 is a schematic diagram showing related signal waveforms regarding the operation of the liquid crystal display 200 illustrated in FIG. 3 based on a first driving method of the present invention, having time along the abscissa. The signal waveforms in FIG. 4, from top to bottom, are the gate signal SGn, the gate signal SGn+1, the first common voltage Vcom1, the first electrode voltage Vp1, the second common voltage Vcom2, and the second electrode voltage Vp2. Referring to FIG. 4 in conjunction with FIG. 3, during an interval T1, the first common voltage Vcom1 switches from a first voltage level to a second voltage level, and the second common voltage Vcom2 switches from the second voltage level to the first voltage level. During an interval T2 not overlapped with the interval T1, the first electrode voltage Vp1 is set to a first high voltage Vx1 by the first data switch 211 according to the data signal SDm and the first gate pulse of the gate signal SGn, and the second electrode voltage Vp2 is set to a first low voltage Vy1 by the second data switch 212 according to the data signal SDm+1 and the first gate pulse of the gate signal SGn.

During an interval T3 partly overlapped with the interval T2, the first common voltage Vcom1 is furnished to the first storage capacitor 221 by the first auxiliary switch 231 according to the second gate pulse of the gate signal SGn+1 which is partly overlapped with the first gate pulse, and the second common voltage Vcom2 is furnished to the second storage capacitor 222 by the second auxiliary switch 232 according to the second gate pulse of the gate signal SGn+1. During an interval T4 within the interval T3 and not overlapped with the interval T2, the first data switch 211 and the second data switch 212 are both turned off by the gate signal SGn having low-level voltage. Further, the first common voltage Vcom1 switches from the second voltage level to the first voltage level for adjusting the first electrode voltage Vp1, and the second common voltage Vcom2 switches from the first voltage level to the second voltage level for adjusting the second electrode voltage Vp2. During an interval T5 within the interval T4, the first electrode voltage Vp1 is pulled down to a second high voltage Vx2 by the falling edge of the first gate pulse through coupling of the device capacitor of the first data switch 211, and the second electrode voltage Vp2 is pulled down to a second low voltage Vy2 by the falling edge of the first gate pulse through coupling of the device capacitor of the second data switch 212.

During an interval T6 within the interval T4, the first electrode voltage Vp1 is pulled up to a third high voltage Vx3 by the rising edge of the first common voltage Vcom1 through coupling of the first storage capacitor 221, and the second electrode voltage Vp2 is pulled down to a third low voltage Vy3 by the falling edge of the second common voltage Vcom2 through coupling of the second storage capacitor 222, for enlarging the difference between the first electrode voltage Vp1 and the second electrode voltage Vp2, such that the voltage drop across opposite sides of the liquid crystal capacitor 235 can be enlarged to effectively control liquid-crystal transmittance. During an interval T7 not overlapped with the interval T4, the first auxiliary switch 231 and the second auxiliary switch 232 are both turned off by the gate signal SGn+1 having low-level voltage. At this time, the first electrode voltage Vp1 is pulled down to a fourth high voltage Vx4 by the falling edge of the second gate pulse through coupling of the device capacitor of the first auxiliary switch 231, and the second electrode voltage Vp2 is pulled down to a fourth low voltage Vy4 by the falling edge of the second gate pulse through coupling of the device capacitor of the second auxiliary switch 232. The difference between the fourth high voltage Vx4 and the fourth low voltage Vy4 is substantially identical to the difference between the third high voltage Vx3 and the third low voltage Vy3. It is noted that the first auxiliary switch 231 and the second auxiliary switch 232 are both retained to be in an open state after the interval T4. Consequently, after the interval T4, the rising/falling edge of the first common voltage Vcom1 has no effect on the first electrode voltage Vp1, and the rising/falling edge of the second common voltage Vcom2 has no effect on the second electrode voltage Vp2. That is, after the interval T4, the enlarged difference between the first electrode voltage Vp1 and the second electrode voltage Vp2 is stabilized so that the voltage drop across opposite sides of the liquid crystal capacitor 235 can be employed to provide a stable control of liquid-crystal transmittance, thereby avoiding the phenomena of flickering and color-shift on LCD screen to achieve high display quality.

Figure 5:
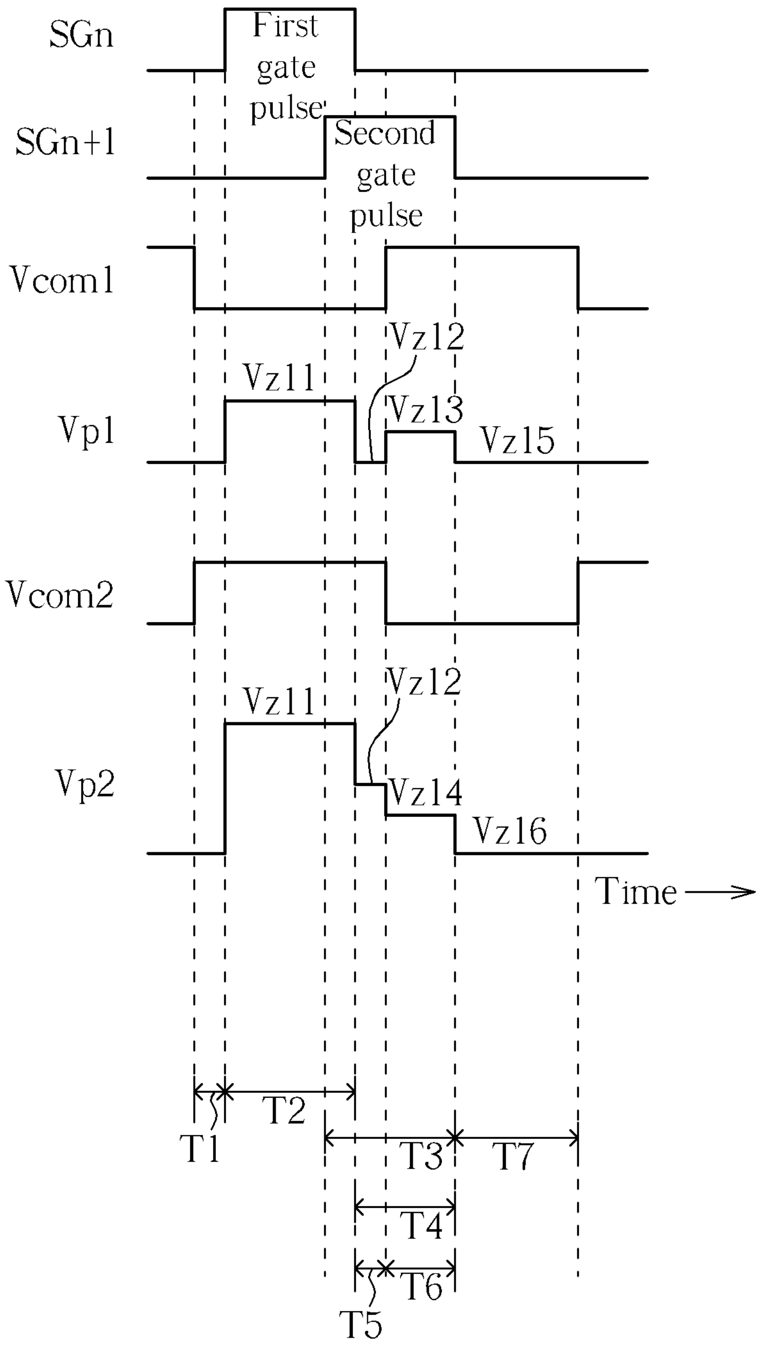
FIG. 5 is a schematic diagram showing related signal waveforms regarding the operation of the liquid crystal display illustrated in FIG. 3 based on the aforementioned first driving method when two data signals received by the pixel unit are both at the same voltage level, having time along the abscissa.

FIG. 5 is a schematic diagram showing related signal waveforms regarding the operation of the liquid crystal display 200 illustrated in FIG. 3 based on the aforementioned first driving method when two data signals received by the pixel unit are both at the same voltage level, having time along the abscissa. The signal waveforms in FIG. 5, from top to bottom, are the gate signal SGn, the gate signal SGn+1, the first common voltage Vcom1, the first electrode voltage Vp1, the second common voltage Vcom2, and the second electrode voltage Vp2. Referring to FIG. 5 in conjunction with FIG. 3, during an interval T1, the first common voltage Vcom1 switches from the first voltage level to the second voltage level, and the second common voltage Vcom2 switches from the second voltage level to the first voltage level. During an interval T2 not overlapped with the interval T1, the first electrode voltage Vp1 is set to a voltage Vz11 by the first data switch 211 according to the data signal SDm and the first gate pulse of the gate signal SGn, and the second electrode voltage Vp2 is also set to the voltage Vz11 by the second data switch 212 according to the first gate pulse and the data signal SDm+1 having the same voltage level as the data signal SDm, i.e. the difference between the first electrode voltage Vp1 and the second electrode voltage Vp2 is substantially zero at this time.

During an interval T3 partly overlapped with the interval T2, the first common voltage Vcom1 is furnished to the first storage capacitor 221 by the first auxiliary switch 231 according to the second gate pulse of the gate signal SGn+1 which is partly overlapped with the first gate pulse, and the second common voltage Vcom2 is furnished to the second storage capacitor 222 by the second auxiliary switch 232 according to the second gate pulse of the gate signal SGn+1. During an interval T4 within the interval T3 and not overlapped with the interval T2, the first data switch 211 and the second data switch 212 are both turned off by the gate signal SGn having low-level voltage. Further, the first common voltage Vcom1 switches from the second voltage level to the first voltage level for adjusting the first electrode voltage Vp1, and the second common voltage Vcom2 switches from the first voltage level to the second voltage level for adjusting the second electrode voltage Vp2. During an interval T5 within the interval T4, the first electrode voltage Vp1 is pulled down to a voltage Vz12 by the falling edge of the first gate pulse through coupling of the device capacitor of the first data switch 211, and the second electrode voltage Vp2 is also pulled down to the voltage Vz12 by the falling edge of the first gate pulse through coupling of the device capacitor of the second data switch 212, i.e. the difference between the first electrode voltage Vp1 and the second electrode voltage Vp2 is still zero at this time. During an interval T6 within the interval T4, the first electrode voltage Vp1 is pulled up to a voltage Vz13 by the rising edge of the first common voltage Vcom1 through coupling of the first storage capacitor 221, and the second electrode voltage Vp2 is pulled down to a voltage Vz14 by the falling edge of the second common voltage Vcom2 through coupling of the second storage capacitor 222, i.e. the difference between the first electrode voltage Vp1 and the second electrode voltage Vp2 significantly departs from zero at this time.

During an interval T7 not overlapped with the interval T4, the first auxiliary switch 231 and the second auxiliary switch 232 are both turned off by the gate signal SGn+1 having low-level voltage. At this time, the first electrode voltage Vp1 is pulled down to a voltage Vz15 by the falling edge of the second gate pulse through coupling of the device capacitor of the first auxiliary switch 231, and the second electrode voltage Vp2 is pulled down to a voltage Vz16 by the falling edge of the second gate pulse through coupling of the device capacitor of the second auxiliary switch 232. The difference between the voltage Vz15 and the voltage Vz16 is substantially identical to the difference between the voltage Vz13 and the voltage Vz14. That is, in the operation of the liquid crystal display 200 employing the aforementioned first driving method, if the data signal SDm and the data signal SDm+1 received by the pixel unit PXn_m are both at the same voltage level, the rising edge of the first common voltage Vcom1 and the falling edge of the second common voltage Vcom2 will result in nonzero difference between the first electrode voltage Vp1 and the second electrode voltage Vp2 during the interval T4, thereby degrading display quality. Besides, as shown in FIG. 4 and FIG. 5, because the second electrode voltage Vp2 is significantly pulled down by both the falling edges of the first and second gate pulses, the voltage Vy4 or Vz16 may be too low for the second data switch 212 to function properly, and an improper charging event may occur to the second storage capacitor 222, which in turn causes an improper shift of the second electrode voltage Vp2 and further degrades display quality.

Figure 6:
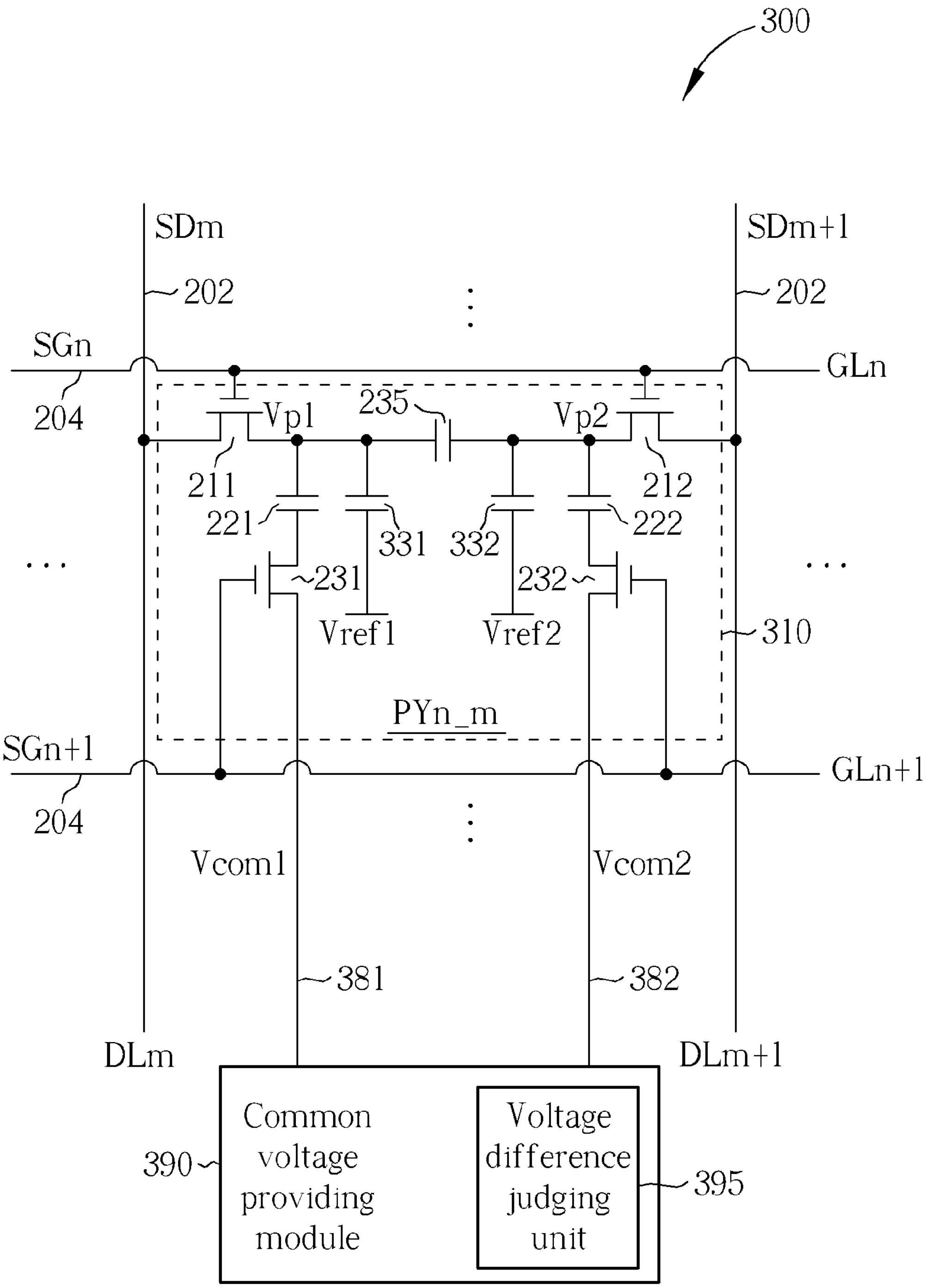
FIG. 6 is a schematic diagram showing a liquid crystal display in accordance with a second embodiment.

FIG. 6 is a schematic diagram showing a liquid crystal display in accordance with a second embodiment of the present invention. As shown in FIG. 6, the liquid crystal display 300 comprises a plurality of data lines 202 for transmitting data signals, a plurality of gate lines 204 for transmitting gate signals, a plurality of pixel units 310, a first common line 381, a second common line 382, and a common voltage providing module 390 for providing a first common voltage Vcom1 and a second common voltage Vcom2. In the following, pixel unit PYn_m is utilized for illustrating interconnections and circuit functions of each component of the pixel units 310. The pixel unit PYn_m is similar to the pixel unit PXn_m shown in FIG. 3, differing primarily in further comprising a third storage capacitor 331 and a fourth storage capacitor 332. The third storage capacitor 331 comprises a first end electrically connected to the second end of the first data switch 211, and a second end for receiving a first reference voltage Vref1. The fourth storage capacitor 332 comprises a first end electrically connected to the second end of the second data switch 212, and a second end for receiving a second reference voltage Vref2. The second reference voltage Vref2 may be identical to or different from the first reference voltage Vref1. In a preferred embodiment, the first reference voltage Vref1 and the second reference voltage Vref2 are both ground voltage. The first common line 381 is electrically connected between the first end of the first auxiliary switch 231 and the common voltage providing module 390, and is employed to transmit the first common voltage Vcom1. The second common line 382 is electrically connected between the first end of the second auxiliary switch 232 and the common voltage providing module 390, and is employed to transmit the second common voltage Vcom2. In one embodiment, the wiring area of the first common line 381 may include a first wiring overlap area which overlaps the wiring area of the data line DLm. The first common line 381 and the data line DLm are separated by a first insulation layer in the first wiring overlap area. Similarly, the wiring area of the second common line 382 may include a second wiring overlap area which overlaps the wiring area of the data line DLm+1. The second common line 382 and the data line DLm+1 are separated by a second insulation layer in the second wiring overlap area. The layout design based on double metal overlap wiring technique is well known to those skilled in the art and, for the sake of brevity, further discussion thereof is omitted.

The common voltage providing module 390 comprises a voltage difference judging unit 395. The voltage difference judging unit 395 is put in use for judging whether the voltage levels of the data signal SDm and the data signal SDm+1 are identical or different. And the common voltage providing module 390 is utilized for providing the first common voltage Vcom1 and the second common voltage Vcom2 according to the judging result of the voltage difference judging unit 395. In another embodiment, the voltage difference judging unit 395 is arranged externally to the common voltage providing module 390. Regarding the operation of the liquid crystal display 300 based on a second driving method of the present invention, if the data signal SDm and the data signal SDm+1 are judged to be at different voltage levels by the voltage difference judging unit 395, the common voltage providing module 390 switches the first common voltage Vcom1 from the second voltage level to the first voltage level, and switches the second common voltage Vcom2 from the first voltage level to the second voltage level during the interval corresponding to the second gate pulse of the gate signal SGn+1 as shown in FIG. 4 or FIG. 5, for enlarging the difference between the first electrode voltage Vp1 and the second electrode voltage Vp2. Alternatively, if the data signal SDm and the data signal SDm+1 are judged to be at the same voltage level by the voltage difference judging unit 395, the common voltage providing module 390 provides the first common voltage Vcom1 with a first fixed level and the second common voltage Vcom2 with a second fixed level during the interval corresponding to the second gate pulse of the gate signal SGn+1, for retaining zero difference between the first electrode voltage Vp1 and the second electrode voltage Vp2. The second fixed level maybe identical to or different from the first fixed level.

The coupling effect of the third storage capacitor 331 is employed to reduce pull-down amount of the first electrode voltage Vp1 caused by the falling edges of the first and second gate pulses, such that the first data switch 211 is able to function properly with all the working levels of the first electrode voltage Vp1. Likewise, the coupling effect of the fourth storage capacitor 332 is employed to reduce pull-down amount of the second electrode voltage Vp2 caused by the falling edges of the first and second gate pulses, such that the second data switch 212 is able to function properly with all the working levels of the second electrode voltage Vp2. That is, the coupling effects of the third storage capacitor 331 and the fourth storage capacitor 332 are employed to avoid degrading display quality.

Figure 7:
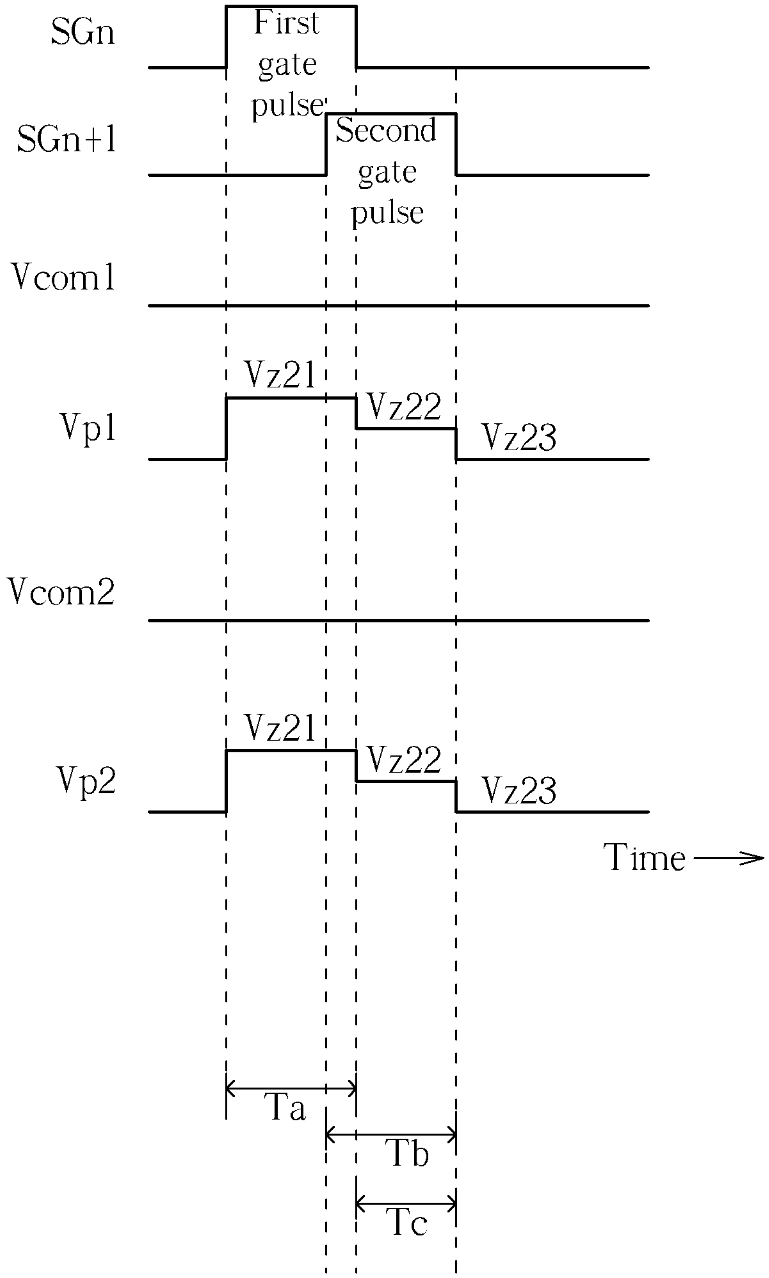
FIG. 7 is a schematic diagram showing related signal waveforms regarding the operation of the liquid crystal display illustrated in FIG. 6 based on a second driving method of the present invention when two data signals received by the pixel unit are both at the same voltage level, having time along the abscissa.

FIG. 7 is a schematic diagram showing related signal waveforms regarding the operation of the liquid crystal display 300 illustrated in FIG. 6 based on the aforementioned second driving method when two data signals received by the pixel unit are both at the same voltage level, having time along the abscissa. The signal waveforms in FIG. 7, from top to bottom, are the gate signal SGn, the gate signal SGn+1, the first common voltage Vcom1, the first electrode voltage Vp1, the second common voltage Vcom2, and the second electrode voltage Vp2. Referring to FIG. 7 in conjunction with FIG. 6, during an interval Ta, the first electrode voltage Vp1 is set to a voltage Vz21 by the first data switch 211 according to the data signal SDm and the first gate pulse of the gate signal SGn, and the second electrode voltage Vp2 is also set to the voltage Vz21 by the second data switch 212 according to the first gate pulse and the data signal SDm+1 having the same voltage level as the data signal SDm, i.e. the difference between the first electrode voltage Vp1 and the second electrode voltage Vp2 is substantially zero at this time.

During an interval Tb partly overlapped with the interval Ta, since the data signal SDm and the data signal SDm+1 are judged to be at the same voltage level by the voltage difference judging unit 395, the common voltage providing module 390 outputs the first common voltage Vcom1 with the first fixed level to the first common line 381, and outputs the second common voltage Vcom2 with the second fixed level to the second common line 382. Meanwhile, the first common voltage Vcom1 is furnished to the first storage capacitor 221 by the first auxiliary switch 231 according to the second gate pulse of the gate signal SGn+1 which is partly overlapped with the first gate pulse, and the second common voltage Vcom2 is furnished to the second storage capacitor 222 by the second auxiliary switch 232 according to the second gate pulse of the gate signal SGn+1.

During an interval Tc within the interval Tb and not overlapped with the interval Ta, the first data switch 211 and the second data switch 212 are both turned off by the gate signal SGn having low-level voltage. At this time, the first electrode voltage Vp1 is pulled down to a voltage Vz22 by the falling edge of the first gate pulse through coupling of the device capacitor of the first data switch 211, and the second electrode voltage Vp2 is also pulled down to the voltage Vz22 by the falling edge of the first gate pulse through coupling of the device capacitor of the second data switch 212. Because the first common voltage Vcom1 and the second common voltage Vcom2 are both retained to be fixed during the interval Tc, there is no difference enlarging operation performed on the first electrode voltage Vp1 and the second electrode voltage Vp2, for retaining zero difference between the first electrode voltage Vp1 and the second electrode voltage Vp2.

After the interval Tc, the first auxiliary switch 231 and the second auxiliary switch 232 are both turned off by the gate signal SGn+1 having low-level voltage. Further, the first electrode voltage Vp1 is pulled down to a voltage Vz23 by the falling edge of the second gate pulse through coupling of the device capacitor of the first auxiliary switch 231, and the second electrode voltage Vp2 is pulled down to the voltage Vz23 by the falling edge of the second gate pulse through coupling of the device capacitor of the second auxiliary switch 232. And the difference between the first electrode voltage Vp1 and the second electrode voltage Vp2 is retained to be zero at least until next frame time. That is, in the operation of the liquid crystal display 300 employing the aforementioned second driving method, if the data signal SDm and the data signal SDm+1 received by the pixel unit PYn_m are both at the same voltage level, the first common voltage Vcom1 and the second common voltage Vcom2 are both retained to be fixed during the interval Tc so as to retain zero difference between the first electrode voltage Vp1 and the second electrode voltage Vp2, for enhancing display quality. Further, the coupling effects of the third storage capacitor 331 and the fourth storage capacitor 332 can be employed to reduce the pull-down amounts of the first electrode voltage Vp1 and the second electrode voltage Vp2 which are caused by the falling edges of the first and second gate pulses. For that reason, the difference between the voltages Vz22 and Vz21 is significantly less than the difference between the voltages Vz12 and Vz11 shown in FIG. 5, and the difference between the voltages Vz23 and Vz22 is significantly less than the difference between the voltages Vz16 and Vz14 shown in FIG. 5, such that each data switch is able to function properly with all the working levels of one corresponding electrode voltage so as to avoid degrading display quality.

In the embodiments described above, for operation of the liquid crystal display according to the present invention, the difference between the first and second electrode voltages is enlarged by the level switching operations of the first and second common voltages through coupling of the first and second storage capacitors. Further, the enlarged difference is stabilized by utilization of the first and second auxiliary switches which provide a control of furnishing the first and second common voltages respectively to the first and second storage capacitors, such that the voltage drop across opposite sides of the liquid crystal capacitor is enlarged and stabilized for giving a superior control of liquid-crystal transmittance, thereby avoiding the phenomena of flickering and color-shift on LCD screen to achieve high display quality. Besides, if two data signals received by a pixel unit are both at the same voltage level, the first and second common voltages furnished to the pixel unit are both retained to be fixed according to the judging result of the voltage difference judging unit, for retaining zero difference between the first and second electrode voltages to ensure high display quality.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display comprising:

a first gate line for transmitting a first gate signal;

a second gate line for transmitting a second gate signal;

a first data line for transmitting a first data signal;

a second data line for transmitting a second data signal;

a first data switch having a first end electrically connected to the first data line for receiving the first data signal, agate end electrically connected to the first gate line for receiving the first gate signal, and a second end for outputting a first electrode voltage;

a second data switch having a first end electrically connected to the second data line for receiving the second data signal, a gate end electrically connected to the first gate line for receiving the first gate signal, and a second end for outputting a second electrode voltage;

a liquid crystal capacitor, electrically connected between the second end of the first data switch and the second end of the second data switch, for controlling liquid-crystal transmittance according to a difference between the first electrode voltage and the second electrode voltage;

a first storage capacitor having a first end electrically connected to the second end of the first data switch and a second end;

a first auxiliary switch having a first end for receiving a first common voltage, agate end electrically connected to the second gate line for receiving the second gate signal, and a second end electrically connected to the second end of the first storage capacitor, wherein the first auxiliary switch is employed to provide a control of furnishing the first common voltage to the second end of the first storage capacitor according to the second gate signal;

a second storage capacitor having a first end electrically connected to the second end of the second data switch and a second end; and a second auxiliary switch having a first end for receiving a second common voltage, agate end electrically connected to the second gate line for receiving the second gate signal, and a second end electrically connected to the second end of the second storage capacitor, wherein the second auxiliary switch is employed to provide a control of furnishing the second common voltage to the second end of the second storage capacitor according to the second gate signal;

providing the second gate pulse partly overlapped with the first gate pulse to the second gate line during a second interval partly overlapped with the first interval;

the first auxiliary switch furnishing the first common voltage to the first storage capacitor according to the second gate pulse, and the second auxiliary switch furnishing the second common voltage to the second storage capacitor according to the second gate pulse during the second interval;

providing the first gate signal having low-level voltage for turning off the first and second data switches during a third interval within the second interval and not overlapped with the first interval; and providing the second gate signal having low-level voltage for turning off the first and second auxiliary switches after the third interval.

2. The liquid crystal display of claim 1, wherein the first data switch, the second data switch, the first auxiliary switch and the second auxiliary switch are thin film transistors or field effect transistors.

3. The liquid crystal display of claim 1, wherein the first common voltage and the second common voltage are ac voltages.

4. The liquid crystal display of claim 3, wherein the second common voltage has a phase opposite to the first common voltage.

5. The liquid crystal display of claim 1, further comprising:

a third storage capacitor having a first end electrically connected to the second end of the first data switch and a second end for receiving a first reference voltage; and a fourth storage capacitor having a first end electrically connected to the second end of the second data switch and a second end for receiving a second reference voltage.

6. The liquid crystal display of claim 5, wherein the second reference voltage is identical to or different from the first reference voltage.

7. The liquid crystal display of claim 5, wherein the first reference voltage and the second reference voltage are both ground voltage.

8. The liquid crystal display of claim 1, further comprising:

a first common line, electrically connected to the first end of the first auxiliary switch, for transmitting the first common voltage;

a second common voltage, electrically connected to the first end of the second auxiliary switch, for transmitting the second common voltage; and a common voltage providing module, electrically connected to the first common line and the second common line, for providing the first common voltage and the second common voltage.

9. The liquid crystal display of claim 8, wherein a wiring area of the first common line includes a first wiring overlap area which overlaps a wiring area of the first data line, and the first common line and the first data line are separated by a first insulation layer in the first wiring overlap area.

10. The liquid crystal display of claim 8, wherein a wiring area of the second common line includes a second wiring overlap area which overlaps a wiring area of the second data line, and the second common line and the second data line are separated by a second insulation layer in the second wiring overlap area.

11. The liquid crystal display of claim 8, wherein the common voltage providing module comprises:

a voltage difference judging unit for judging whether a voltage level of the first data signal is identical to or different from a voltage level of the second data signal;

wherein the common voltage providing module provides the first and second common voltages according to a judging result of the voltage difference judging unit.

12. The liquid crystal display of claim 11, wherein if the first data signal and the second data signal are judged to be at different voltage levels by the voltage difference judging unit, the common voltage providing module switches the first common voltage from a first voltage level to a second voltage level different from the first voltage level, and switches the second common voltage from the second voltage level to the first voltage level during an interval corresponding to a gate pulse of the second gate signal.

13. The liquid crystal display of claim 11, wherein if the first data signal and the second data signal are judged to be at a same voltage level by the voltage difference judging unit, the common voltage providing module provides the first common voltage with a first fixed level and the second common voltage with a second fixed level during an interval corresponding to a gate pulse of the second gate signal.

14. The liquid crystal display of claim 8, further comprising:

a voltage difference judging unit for judging whether a voltage level of the first data signal is identical to or different from a voltage level of the second data signal;

wherein the common voltage providing module provides the first and second common voltages according to a judging result of the voltage difference judging unit.

15. A driving method comprising:

providing a liquid crystal display comprising:

a first gate line for transmitting a first gate signal having a first gate pulse;

a second gate line for transmitting a second gate signal having a second gate pulse;

a first data line for transmitting a first data signal;

a second data line for transmitting a second data signal;

a first data switch for outputting a first electrode voltage according to the first gate pulse and the first data signal;

a second data switch for outputting a second electrode voltage according to the first gate pulse and the second data signal;

a liquid crystal capacitor for controlling liquid-crystal transmittance according to a difference between the first electrode voltage and the second electrode voltage;

a first storage capacitor for storing the first electrode voltage;

a first auxiliary switch for providing a control of adjusting the first electrode voltage by furnishing the first common voltage to the first storage capacitor according to the second gate pulse;

a second storage capacitor for storing the second electrode voltage; and a second auxiliary switch for providing a control of adjusting the second electrode voltage by furnishing the second common voltage to the second storage capacitor according to the second gate pulse;

providing the first gate pulse to the first gate line, providing the first data signal to the first data line, and providing the second data signal to the second data line during a first interval;

the first data switch outputting the first electrode voltage according to the first gate pulse and the first data signal, and the second data switch outputting the second electrode voltage according to the first gate pulse and the second data signal during the first interval;

providing the second gate pulse partly overlapped with the first gate pulse to the second gate line during a second interval partly overlapped with the first interval;

the first auxiliary switch furnishing the first common voltage to the first storage capacitor according to the second gate pulse, and the second auxiliary switch furnishing the second common voltage to the second storage capacitor according to the second gate pulse during the second interval;

providing the first gate signal having low-level voltage for turning off the first and second data switches during a third interval within the second interval and not overlapped with the first interval; and providing the second gate signal having low-level voltage for turning off the first and second auxiliary switches after the third interval.

16. The driving method of claim 15, wherein when the first data signal and the second data signal have different voltage levels, the first common voltage is switched from a first voltage level to a second voltage level different from the first voltage level for adjusting the first electrode voltage during the third interval, and the second common voltage is switched from the second voltage level to the first voltage level for adjusting the second electrode voltage during the third interval, for enlarging the difference between the first and second electrode voltages at opposite sides of the liquid crystal capacitor so as to control liquid-crystal transmittance.

17. The driving method of claim 15, wherein when the first data signal and the second data signal are both at a same voltage level, the first common voltage is set to a first fixed level during the third interval, and the second common voltage is set to a second fixed level during the third interval, for retaining zero difference between the first electrode voltage and the second electrode voltage.

* * * * *